Figure 1:
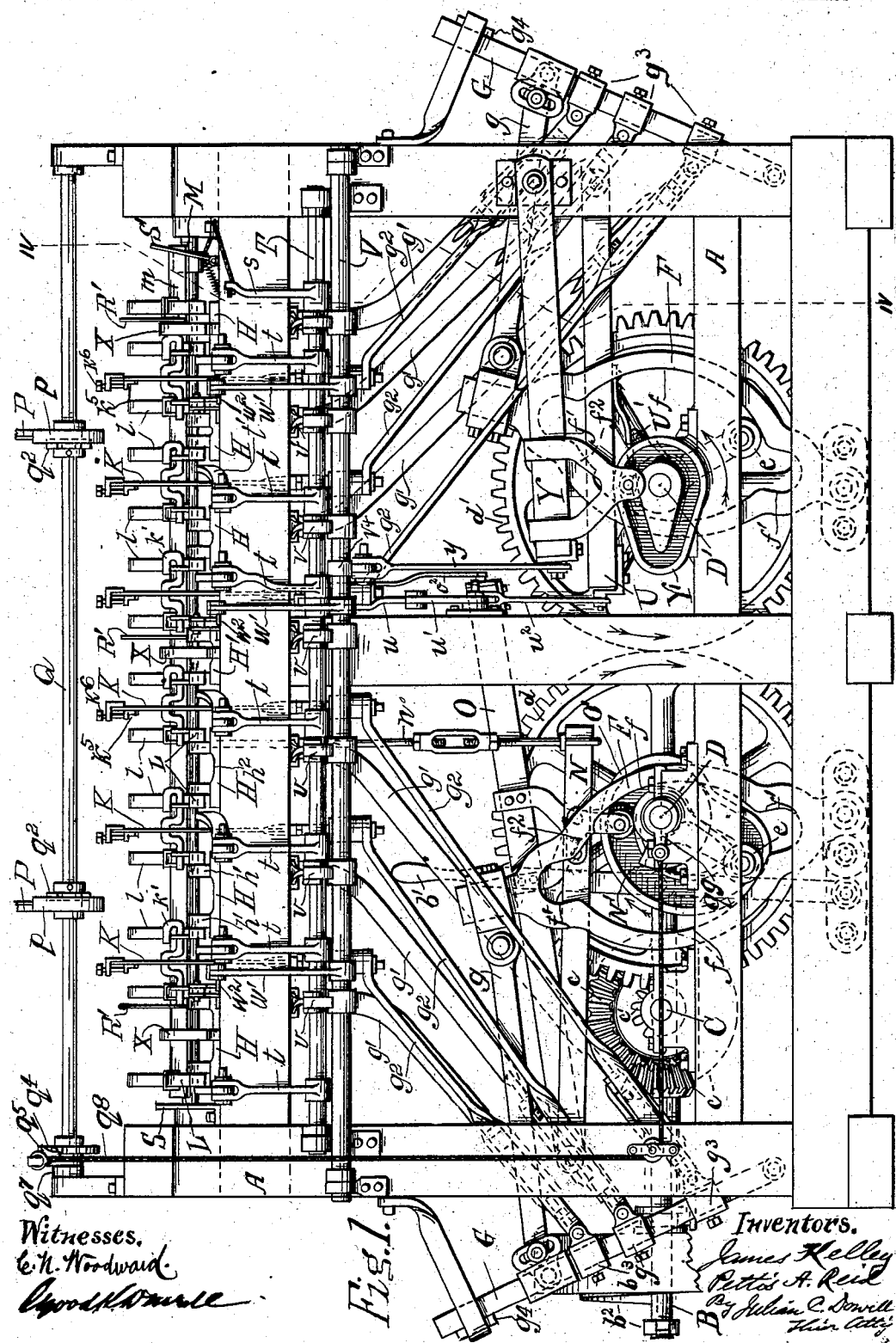

No. 721,567. PATENTED FEB. 24, 1903.
J. KELLEY & P. A. REID.
WIRE STAY MAKING MACHINE.
APPLICATION FILED NOV. 2, 1901.
NO MODEL. 6 SHEETS—SHEET 1.

Witnesses.
Inventors.

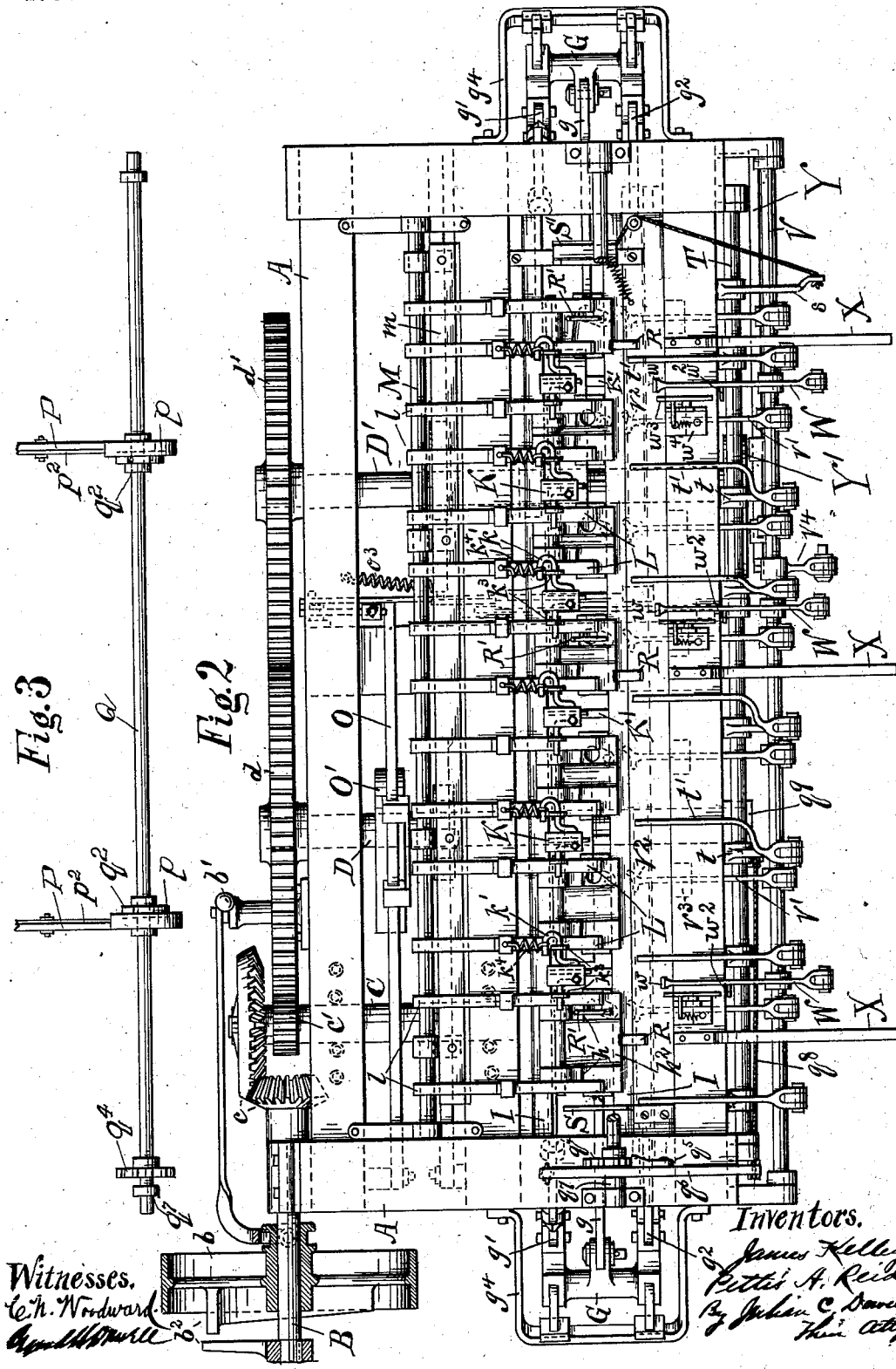

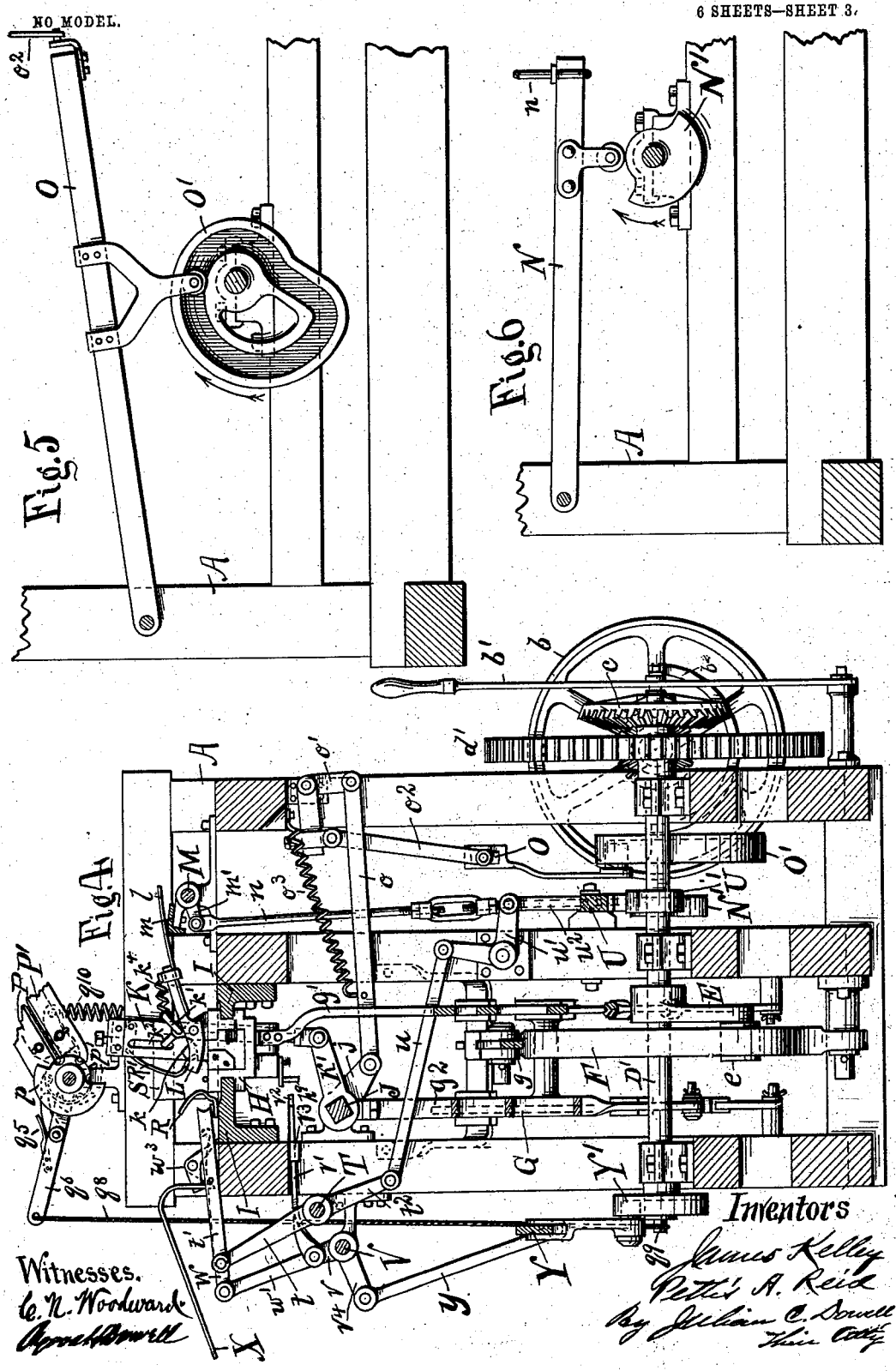

No. 721,567. PATENTED FEB. 24, 1903.
J. KELLEY & P. A. REID.
WIRE STAY MAKING MACHINE.
APPLICATION FILED NOV. 2, 1901.
NO MODEL. 6 SHEETS—SHEET 4.
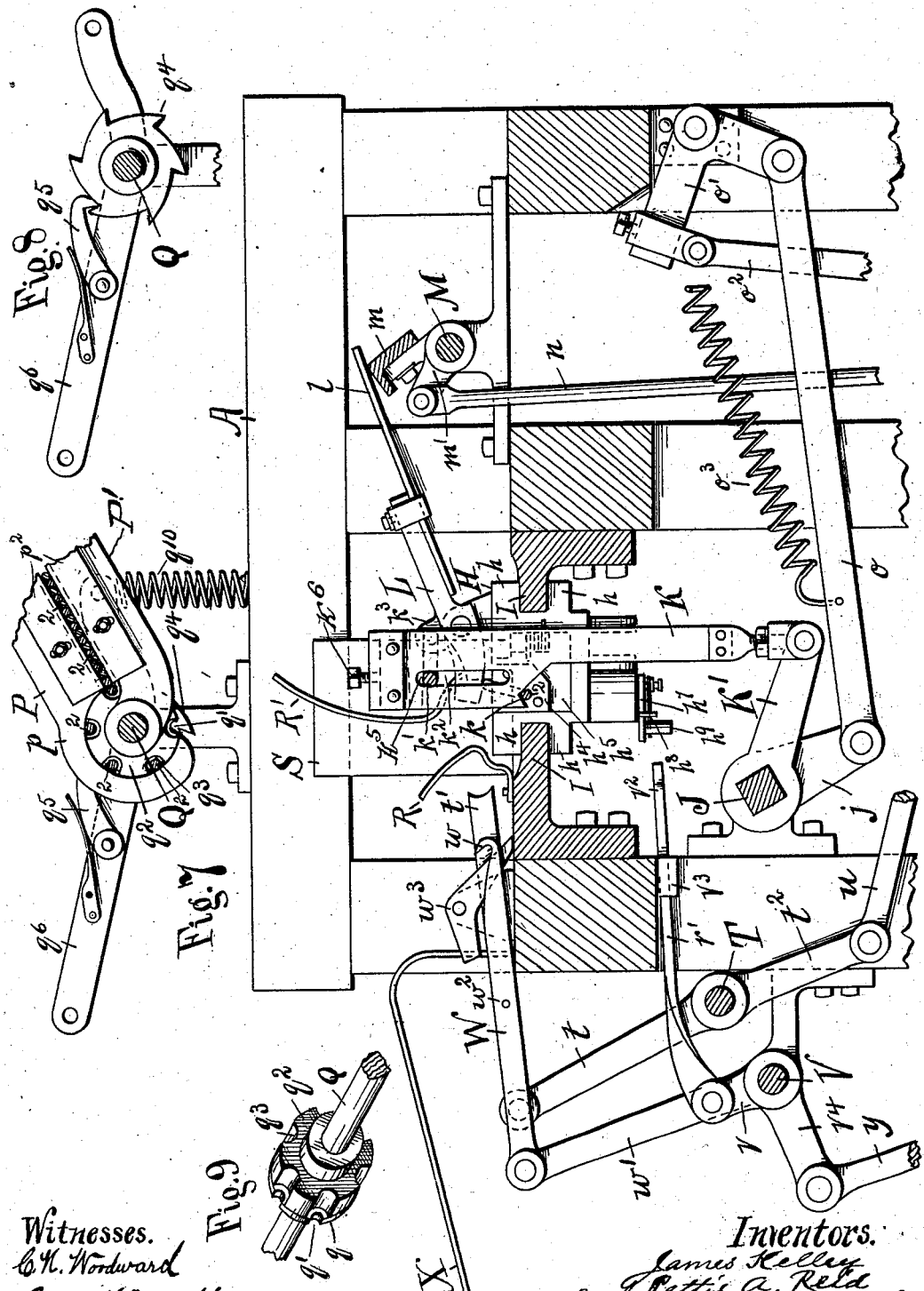
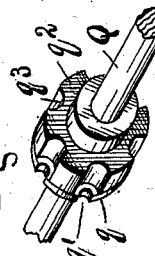
Witnesses.
C. H. Woodward
Inventors.
James Kelley
Pettis A. Reid
By Julian C. Dowell, Atty

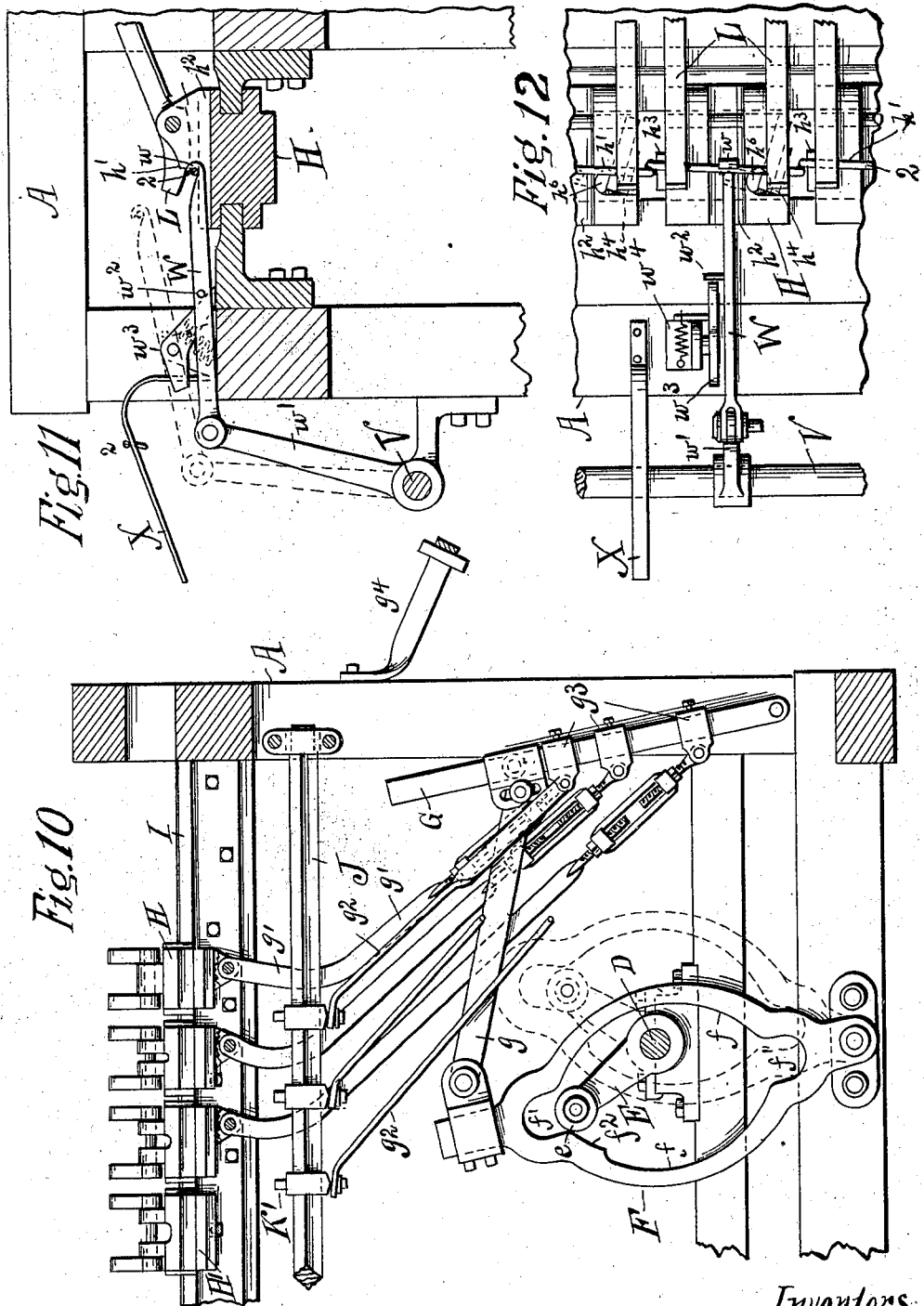

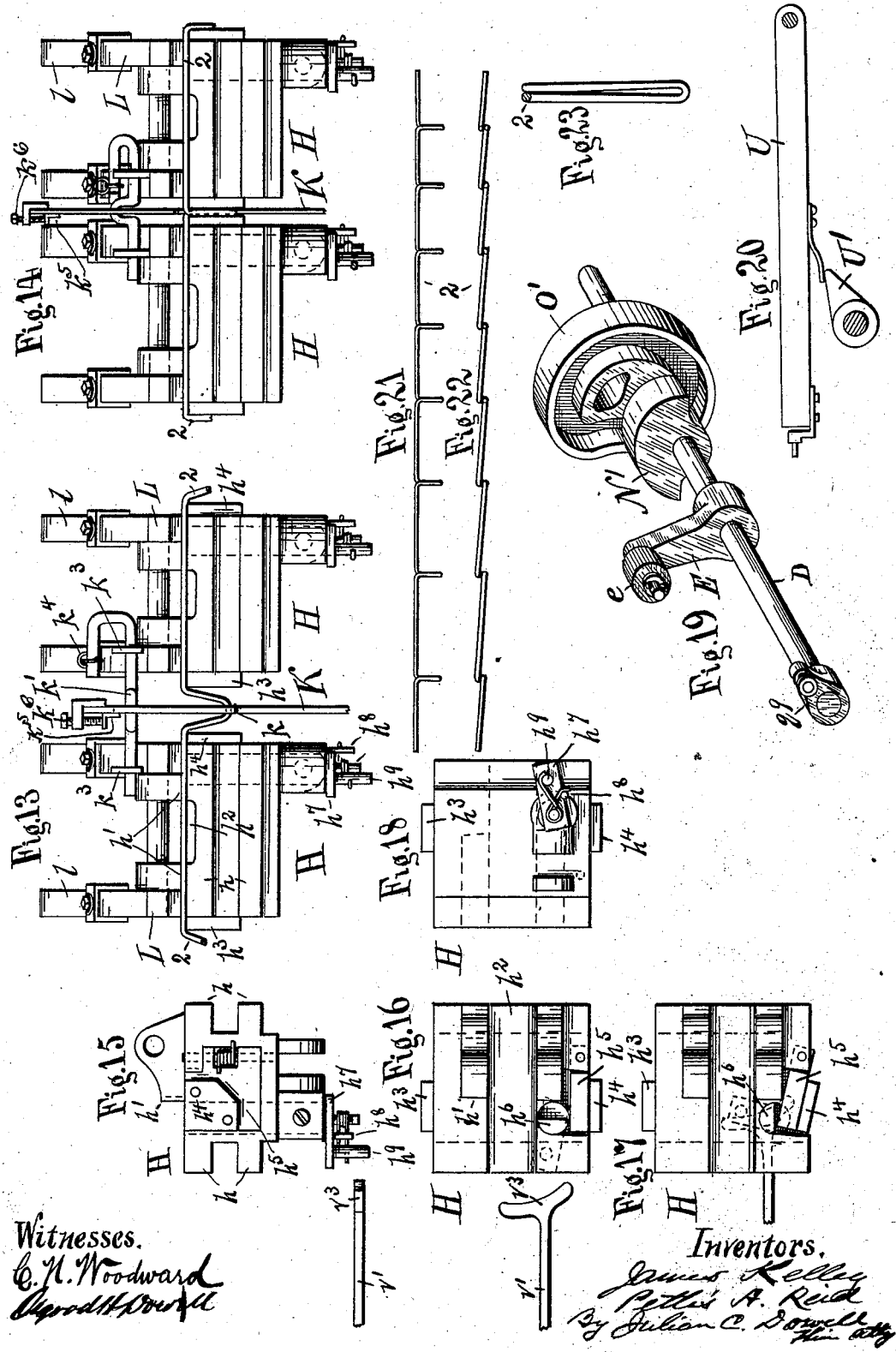

UNITED STATES PATENT OFFICE.

JAMES KELLEY AND PETTIS A. REID, OF RICHMOND, INDIANA; SAID KELLEY ASSIGNOR TO SAID REID.

WIRE-STAY-MAKING MACHINE.

SPECIFICATION forming part of Letters Patent No. 721,567, dated February 24, 1903.

Application filed November 2, 1901. Serial No. 80,957. (No model.)

*To all whom it may concern:*

Be it known that we, JAMES KELLEY and PETTIS A. REID, citizens of the United States, residing at Richmond, in the county of Wayne and State of Indiana, have invented certain new and useful Improvements in Wire-Stay-Making Machines; and we do hereby declare the following to be a full, clear, and exact description of the invention, such as will enable others skilled in the art to which it appertains to make and use the same.

This invention relates to machines for making wire stays or cross-wires designed for attachment to a series of strand-wires in the manufacture of wire fencing or fabrics.

The principal object of the invention is to provide a highly-efficient machine for rapidly producing uniform stays or pickets consisting of wires having at suitable intervals therein bent portions or loops adapted to be wrapped or coiled about the strand-wires for attachment of the stays.

A further object is to provide means for forming said stays with their several loops in substantial alinement, the two members of each loop lying in the same transverse plane and the intermediate portions of the stays diverging or extending, preferably, from and to corresponding members of adjacent loops, as illustrated in Figures 21 to 23, inclusive, herein, which construction combines uniformity and general straightness of the separate stays, with capability of the latter to be placed upon or against a series of strand-wires with both members of each loop contacting with one of said wires, whereby the loops may be twisted about the strand-wires without first bending them to one side or the other of the stay or turning the stay as a whole before beginning the twisting operation, which is obviously advantageous.

The invention will first be hereinafter more particularly described with reference to the accompanying drawings, which form a part of this specification, and then pointed out in the claims following this description.

In said drawings, in which similar parts in the several views are designated by corresponding letters of reference, Fig. 1 is a front elevation of a wire-stay-making machine embodying my invention, the parts being represented in the relative positions assumed immediately after delivery of a wire and prior to the operation of forming the same into a stay. Fig. 2 is a plan view of the same, the wire-feeding device being removed. Fig. 3 is a plan view of the said wire-feeding device. Fig. 4 represents a vertical cross-section taken on line IV IV of Fig. 1. Fig. 5 is a detail view of the lever which actuates the needles or loop-bending devices and operative cam for said lever. Fig. 6 is a similar view of the wire-grabber-actuating lever and its operative cam. Fig. 7 is a partial vertical cross-section of the machine, on an enlarged scale, the parts being represented in the positions assumed during the act of bending portions of a wire in between the loop-pressing clamps or jaws for the purpose of forming the loops. Fig. 8 is a detail view of a ratchet device for controlling the wire-feeding device. Fig. 9 is a detail perspective view of a member of the said feeding device. Fig. 10 is a fragmentary detail view in front elevation, showing the slidable loop-pressing clamps brought together and about to be forced by their actuating member or rocker-cam into closer contact to compress the loops of the stay previously formed between them, the dotted lines indicating the position of said rocker-cam and its operating-roller immediately before throw in a direction to bring the said clamps together. Figs. 11 and 12 are fragmentary detail views, in vertical cross-section and plan, respectively, showing the operation of withdrawing or ejecting the finished stay from the machine. Fig. 13 is a detail view, in front elevation, of two adjacent clamps and an inter-arranged needle, showing the operation of bending intermediate portions of the wire in between the clamps while the latter move inwardly or together. Fig. 14 is a similar view showing the clamps closed or brought together and the needle raised to escape the same. Fig. 15 is a detail view, in end elevation, of one of the clamps, together with the forked or notched end of a push-rod for operating an eccentric device to permit a movable face portion or plate in one of the sides or faces of said clamp to recede or move inward to release the loop of the stay pressed between adjacent clamps. Fig. 16 is a plan view of said clamp and push-rod. Fig. 17 is also a plan view of said clamp and push-rod, showing, partly in dotted lines, the rod in the act of operating the said movable face-plate to release the loop. Fig. 18 is a bottom view of one of the clamps. Fig. 19 is a detail perspective view of one of the driving-shafts with its several cranks and cams in proper relative positions thereon. Fig. 20 is a detail view of a lever which actuates mechanism for forcing the wire into proper position upon the clamps prior to the operation of forming the same into a stay and operating-cam for said lever. Figs. 21 and 22 are front and plan elevations, respectively, of a finished stay produced by the machine herein illustrated; and Fig. 23 represents an enlarged end elevation of said stay.

Preliminarily to a more detailed description it may be stated that in carrying our invention into effect the wires which are to be formed into stays or pickets being first cut into proper lengths are successively delivered upon or against a series of alternately separating and closing clamps or jaws, which prior to each stay-forming operation are caused to separate at preferably substantially equal distances between adjacent clamps. Each wire as it is delivered is temporarily rigidly secured in proper position against said open clamps, and the latter are thereupon caused to move together, while simultaneously the intermediate portions of the wire spanning the spaces between adjacent clamps are bent and forced down or in between the latter, thus producing folds or loops therein, which are compressed between the faces of the clamps as they finally close together, whereupon the clamps are caused to release the loops to permit the finished stay to be withdrawn and ejected from the machine.

Referring to the drawings by specific letters of reference, A designates a suitable machine-frame, and the letter B denotes a driving-shaft, to which power may be applied at a friction-pulley $b$, herein represented (more clearly in Fig. 2) as loosely mounted on the driving-shaft and adapted to be moved by a lever $b'$ into or out of driving engagement therewith, as by means of the clutch $b^2$, so as to operate or stop the machine at will. As herein represented, the shaft B drives, through the medium of bevel-gearing $c$, a counter-shaft C, having a pinion $c'$ thereon in gear with one of a pair of equal intermeshing spur-wheels $d$ and $d'$, keyed or otherwise secured on the main driving-shafts D and D', from which latter motion is transmitted to the various operative parts of the machine.

The main shafts D and D' are provided with cranks E, secured one to each shaft and set, preferably, at such relation to each other that their opposite revolutions occur synchronously, and said cranks carry rollers $e$, which travel in operative engagement with a pair of oppositely, intermittently, and synchronously rocking actuating members or rocker-cams F, from which, preferably through the medium of rocker members G, connected to said rocker-cams by suitable rods $g$, intermittent reciprocatory motion is transmitted to a series of loop-compressing clamps or jaws H, slidably supported between guides or ribs I at the upper part of the machine, Figs. 4, 7, and 10, and which in the present construction are arranged to separate and close or come together from and toward the middle of the series or from and toward an intermediate stationary clamp, (designated by the letter H',) the said movable clamps at each side of said stationary one being connected to the corresponding rocker members G by suitable connecting-rods $g'$ and from which rocker-cams also similar reciprocatory motion is transmitted to a series of needles or loop-bending devices K, disposed midway between adjacent clamps and arranged to travel longitudinally therewith, said needles being herein pivotally mounted upon a series of rocker-arms K', slidably secured on a square or polygonal rock-shaft J, Figs. 4 and 7, which on rocking thus alternately depresses and elevates the needles, and the said slidable rocker-arms at each side of the said stationary clamp being also connected to the corresponding rocker members G by suitable connecting-rods $g^2$. The connecting-rods $g'$ and $g^2$ are preferably of such length and secured to the rocker members G at such positions that the clamps are caused to separate at equal distances and to close evenly and the needles caused to maintain at all times substantially midway positions between adjacent clamps for a purpose which will hereinafter appear, and the said rocker members G may consist of parallel bars rigidly secured together, to one of which bars of each member the rods $g'$ may be secured and to the other bar the rods $g^2$, both preferably by adjustable connections, as the sleeves $g^3$, slidable on the bars and secured in place by set-screws or other suitable means. Outward movement or throw of the rocker members G, and consequently also separation of the clamps, may be properly limited by suitable buffers, as $g^4$, while inward throw of the members is of course limited by the closing of the clamps.

Each wire to be formed into a stay is temporarily rigidly secured in proper position upon or against the clamps G when the latter stand open or separated, and said clamps are then caused to move inwardly, while simultaneously the rock-shaft J is turned to depress the needles K, which engage and bend the intermediate portions of the wire spanning the spaces between adjacent clamps down or in between the same, thus producing loops or folds in the wire, which loops are compressed between the clamps when they finally close together, all in the manner hereinafter described.

The rocker-cams F are preferably of internal formation, being each constructed with confronting arc-shaped surfaces $f$, traversed each in turn by the operating-roller e to maintain the member stationary at one or the other of its opposite extreme or inclined positions, and said surfaces terminate at both ends in recesses or cut-away portions $f'$, into the approaching one of which the roller passes as it leaves each arc-shaped surface, striking and bearing against the opposing wall or surface of said recess to throw the rocker-cam from one of its extreme positions to the other and at the completion of the throw traversing the opposite arc-shaped surface to maintain the rocker-cam stationary in such later position. That one of the arc-shaped surfaces of each rocker-cam which the roller travels after throwing the rocker-cam to position to close the clamps H is preferably provided with a short raised portion or projection, as $f^2$, which after such throw the roller passes over to force the member still farther, thus shoving or impelling the said clamps or blocks more closely together and causing them to compress or squeeze the loops of the stay just previously formed between them, while when the roller leaves said projection and travels onto the remaining arc-shaped surface there is permitted a slight reverse movement or backlash of the rocker-cam, and consequent slight reactive movement or separation between the clamps, which are then caused to release the loops to permit the finished stay to be withdrawn from the machine. In the construction herein represented the rocker-cams are thrown outwardly, or to the position shown in Fig. 1, to separate the clamps, and inwardly, or to the position represented in Fig. 10, to close them, the rollers traveling in the directions indicated by the arrows, and it will be observed that by reason of action of the rollers against surfaces respectively nearer and more remote from the fulcrums of the rocker-cams said rocker-cams are moved more swiftly in their outward throws to separate the clamps and with greater power in their inward throws to close said clamps and compress the loops of the stay, which arrangement is thus obviously advantageous.

The slidable clamps H, including the intermediate stationary member H' of the series, may consist of suitable blocks or heads, (shown in detail in Figs. 13 to 18, inclusive,) each of which may be provided with suitable extensions or bifurcations $h$, which slidably embrace the guides I. Said blocks or clamps are also preferably provided at their upper surfaces with upstanding projections or abutments $h'$, against which each wire is lodged when delivered upon the clamps and firmly maintained during the entire operation of forming the loops therein between said abutments, the blocks being transversely grooved or recessed, as at $h^2$, to permit the entrance of hooks beneath the finished stay to withdraw the same from the machine, as illustrated in Figs. 11 and 12. The said abutments $h'$ of each clamp or block are preferably disposed correspondingly obliquely, or one slightly in advance of the other, as illustrated in Figs. 2 and 16, so that a wire forced against the abutments of the several clamps will be correspondingly deflected from its general alinement across each block and oppositely deflected across the intervals between adjacent blocks, being thus held at adjacent sides of adjacent clamps at points one slightly in advance of the other. Consequently when the portions of the wire spanning the intervals between the clamps are bent down by the needles K as the clamps move inwardly, Figs. 7 and 13, the two members of each bent or looped portion of the wire will incline from the needle to points one in advance of the other, and when the clamps finally close together the loops will thus be pressed between the same, with the two members of each loop lying in the same vertical or transverse plane to the body of the stay and the intermediate straight portions of the stay diverging from and to corresponding members of adjacent loops, as illustrated in Figs. 12 and 14, whereby stays may be produced of the character represented in Figs. 21 to 23, inclusive, as mentioned in the objects primarily stated. It will be understood, however, that the abutments may be differently arranged and that stays of different character may be produced. The said clamps or blocks may be further provided, preferably at corresponding sides or faces throughout, with flat anvil plates or projections $h^3$ and at their opposite sides or faces with similar confronting anvil plates or projections $h^4$, which latter are formed on or secured to hinged or movable portions or face-plates $h^5$ in said sides adapted when the clamps are closed to recede into recesses in the latter to release the loops of the stay, said hinged or movable face portions $h^5$ being preferably spring-pressed inwardly against suitable eccentric devices, such as the semicylindrical portions of mutilated spindles $h^6$, journaled behind the hinged face-plates and normally maintained in position to hold the same outward, as shown Fig. 16, but adapted to be turned to permit said face-plates to flap or move inward, as indicated in Fig. 17, in the present construction the said spindles being journaled in tubular sockets at the bottoms of the clamps and provided at their lower protruding ends with short levers or projections $h^7$, spring-forced against suitable pins or stops $h^8$ to hold the face-plates outward, and having depending pins or studs $h^9$, adapted to be simultaneously engaged by the forked or bifurcated ends of a series of push-rods to simultaneously release the face-plates and permit them to move inward, as indicated in Fig. 17. In the stay-making operation, the wire being properly held against the abutments $h'$, the loops are bent down by the needles K between the plates or projections $h^3$ and $h^4$ of adjacent clamps and pressed or clamped between said plates when the clamps are forced together, as shown in Fig. 14, whereupon the hinged face portions $h^5$ move inward to release the loops and to permit the finished stay to be withdrawn. The confronting loop-compressing plates $h^3$ and $h^4$ are preferably vertically disposed for the purpose of forming the loops at right angles to the body of the stay, though it will be understood that said plates or likewise the adjacent faces of the clamps may be correspondingly obliquely disposed for the purpose of producing loops at other angles to the stay, if desired.

It will be observed that in the machine herein illustrated each clamp from end to end of the series is somewhat less in width than the preceding clamp, which arrangement is for the purpose of producing stays having their several loops disposed at successively-closer intervals, as shown in Fig. 21, such stays being thus adapted for attachment to a series of parallel strand-wires arranged at correspondingly-diminishing gages; but the construction may be varied to produce stays of different character, it being obvious that the intervals between the adjacent loops of the stay will be determined by the corresponding widths of the clamps, while the lengths of the loops will be determined by the distances the clamps are caused to separate.

To hold the wire firmly in position upon the clamps during the operation of forming the loops therein, a pair of wire grippers or fingers L may be pivoted at the outer sides of the abutments $h'$ of each clamp, which fingers normally remain raised from the clamps, as shown in Fig. 4; but when the wire is forced back under them against the abutment are immediately caused to bear down upon or to grip the wire, as illustrated in Fig. 7, in the present construction said grippers being provided with rearward extensions $l$, which are slidably supported upon a bar or beam $m$, secured lengthwise to a rock-shaft M, journaled at opposite ends of the machine, and which on rocking thus alternately causes the grippers to grip and release the wire in an obvious manner.

The rock-shaft M may be actuated by a lever N, connected to an arm $m'$ on the rock-shaft, Figs. 4 and 7, by a suitable connecting-rod $n$, and said lever may be operated by a cam N' on one of the main driving-shafts, (here shown on the shaft D, Figs. 1, 6, and 19,) said cam being adapted to suddenly lift or move the lever to cause the grippers to grip the wire as soon as the wire is pushed against the abutments $h'$ of the clamps (by means hereinafter described) to maintain said lever in position to hold the grippers down upon the wire during the entire loop-forming operation and then suddenly to drop or move the lever to release the grippers, as will be clearly understood by reference to Figs. 1 and 6.

The needles or loop-bending devices K, Figs. 4, 7, 13, and 14, which, it will be remembered, are pivotally mounted on the slidable rocker-arms K' to move longitudinally with the clamps, may consist of thin upstanding bars or rods having overhanging notched portions, as $k$, which when the needles are lowered or depressed engage the wire midway adjacent clamps and bend the same down or in between the clamps as they move together, as illustrated in Figs. 7 and 13. The rock-shaft J maintains the needles elevated, as in Fig. 4, until the wire is delivered and secured by the grippers in proper position upon the open clamps, but is preferably moved or turned to lower them well into engagement with the wire at substantially the same instant the clamps begin to move inwardly, continuing to lower them to bend the loops during such inward movement, while just before the clamps finally close together the rock-shaft is oppositely moved to raise the needles in order to carry them away from the wire and to permit them to escape the approaching plates or projections $h^3$ and $h^4$, between which the loops are finally clamped and compressed. In order to properly guide the needles and cause them to bend the several loops of the stay in alinement, said needles may be controlled in their vertical movements by double crank-shaped devices $k'$, which in the present construction are inserted through slots $k^2$ in the upper portions of the needles, their intermediate folds or bends embracing the latter and their ends slidably pivoted in apertured ears $k^3$ on the grippers L to permit the clamps to come together without obstruction, said devices being normally maintained elevated in the slots by retractile springs $k^4$, secured to the wire-grippers and to bends or return folds of the devices, as shown in Figs. 2 and 4. The said double crank-shaped devices thus serve to maintain the needles in their proper upright positions and to guide them in their descent to engage the wire, and when the needles are drawn down to the full extent of the slots $k^2$ said devices, being thus encountered and rocked against force of their springs $k^4$, impart a slight crank motion or forward throw to the needles during their further descent, as will be seen by reference to Fig. 7, causing them to bend the several loops in exact alinement. Downward movement of the needles before engaging the double crank-shaped devices may be limited by movable side plates $k^5$, extending across the upper ends of the slots $k^2$ and adjustable by means of screws $k^6$, as shown more clearly in Figs. 7 and 13.

The rock-shaft J may be actuated to alternately depress and elevate the needles by a lever O, which is herein represented connected to an arm $j$ on the rock-shaft by links $o$ and $o^2$ and an intermediate bell-crank lever $o'$, Figs. 4 and 7, and the lever may be operated by a cam O' on one of the main shafts, (herein shown on the same shaft D as the cam N', which operates the gripper-actuating lever N,) Figs. 1, 5, and 19, said cam O' being adapted to gradually lift or move the lever to draw the needles down upon or into engagement with the wires by the time the clamps begin to move inwardly and to continue such movement to cause the needles to bend the loops while the clamps are moving inwardly and to suddenly drop or oppositely move the lever to raise the needles just before the clamps finally close together, as will be clearly understood by reference to Figs. 1 and 5. It being necessary that the needles be raised instantly to escape the approaching plates $h^3$ and $h^4$ of the clamps, the action may be facilitated by a stout retractile spring $o^3$, herein represented secured to the link $o$ and to a rearward member of the machine-frame, Figs. 4 and 7.

The wires 2 to be formed into stays may be cut into proper lengths and presented from between inclined guide-bars P and P' to an intermittent feed device, which delivers a wire upon the clamps at the proper period prior to each stay-making operation. The said feed device may consist of a longitudinal shaft Q, journaled in the lower extremities of the lower bars P', as shown more clearly in Fig. 7, and having secured thereon adjacent said extremities thin disks or collars $q$, which disks are correspondingly provided with equidistant circumferential notches $q'$ and are partially embraced by curved guards $p$, formed at the lower extremities of the upper bars P and terminating below the shaft. The guide-bars are preferably provided at adjacent edges with adjustable strips $p^2$, between which the wires are supported on their way to the feed device and which may be properly adjusted to prevent crowding or crossing as well as to accommodate wires of different sizes. At each intermittent or partial rotation of the shaft Q one of the notches $q'$ of each disk is brought to register exactly with the spaces between the strips $p^2$, and thus receive a wire, while at the same time a wire previously received by other notches, having been carried around and past the lower extremities of the guards $p$, is dropped therefrom upon the clamps, being directed to fall in proper position upon the latter and in front of the grippers L by suitable guides, as R and R', the former of which guides are herein represented mounted on the front clamp-supporting slide I and the latter upon the clamps themselves. The thin notched disks $q$ are employed in preference to devices of greater thickness in order to facilitate admission of the wires into the notches $q'$ thereof, since in a delicately-constructed apparatus any curve or bend in the wire might retard or prevent its entrance into notches of any substantial length. To fix the disks to the shaft and to provide sufficient bearing within the guards $p$, said disks may be secured to collars $q^2$ on the shaft having circumferential cut-away portions, as $q^3$, at points corresponding to the notches of the disks to prevent interference with the wires, as shown more clearly in Fig. 9. As a means for intermittently rotating the feed device the shaft Q may be provided with a ratchet-wheel $q^4$, Fig. 8, rigidly secured thereon and having its teeth, which correspond in number with the notches of the disks $q$, successively engaged by a spring-pressed pawl $q^5$, carried by a rocking lever $q^6$, which in the present construction is represented as loosely mounted on the shaft Q between the ratchet-wheel and a collar $q^7$ and connected by a cord or rope $q^8$, Figs. 1, 2, and 4, to a crank $q^9$ on one of the main shafts, herein shown on the shaft D, said lever being maintained against pull of the cord by a retractile spring $q^{10}$, which draws down upon a tailpiece of the lever, or by other suitable means. At each revolution of the crank $q^9$ the lever is thus moved by force of the spring when the cord is slack to carry the pawl past the ratchet-tooth next to be engaged and oppositely moved by pull of the cord to partially rotate the feed device, and for economy of time the arrangement is preferably such that the feed device is caused to drop a wire upon the clamps simultaneously as the latter separate.

Mounted on the machine at one end of the series of clamps H is a stationary upright plate or abutment S, and at the opposite end a similar pivotal or movable plate or butter S' is spring-impelled toward the abutment S, but held against force of the spring by connection to a rocker-arm $s$ on a rock-shaft T, which may be longitudinally disposed at the front of the machine. As each wire is delivered upon the clamps the said rock-shaft T is turned to permit the butter to strike the end of the wire and force it endwise against the opposite plate or abutment S, being immediately oppositely turned to draw back the butter as soon as the grippers grip the wire, and thus each wire is held in the same position upon the clamps, and the loops of the several stays are thereby formed at exactly corresponding points.

The rock-shaft T carries a series of upstanding rocker-arms $t$, to which are pivotally secured a series of push-rods $t'$, which when the rock-shaft is rocked to permit the butter to strike the end of the wire move rearward and push the said wire back under the grippers against the abutments $h'$ of the clamps, said push-rods, which may rest upon the upper part of the frame, being preferably arranged to engage the wires at the sides of the clamps next the rearmost abutments of each, as shown in Fig. 2, whereby the wire when forced against the said abutments will be properly obliquely deflected across the several clamps and oppositely deflected across the intervening spaces for the purpose before mentioned.

The rock-shaft T may be actuated by a lever U, which in the arrangement herein represented is connected to an arm $t^2$ on the shaft by links $u$ and $u^2$ and an intermediate bell-crank lever $u'$, Fig. 4, and the lever may be operated by a cam U' on one of the main shafts, herein shown on the shaft D', Figs. 1 and 20, said cam being adapted to lift or move the lever immediately after delivery of a wire upon the clamps to cause the butter S' and push-rods $t'$ to force the wire into proper position upon the latter and then to drop or oppositely move the lever to immediately retract said butter and push-rods as soon as the wire is gripped by the grippers L. A second rock-shaft V, also longitudinally disposed at the front of the machine, carries a series of rocker-arms $v$, to which are pivotally secured a series of push-rods $v'$, having forked or bifurcated ends, as $v^2$, and which rods are herein represented slidably supported on guides $v^3$ on the lower side of the upper front beam or member of the machine-frame, Figs. 1, 4, and 7. After each stay-making operation, the clamps being closed and pressing the loops of the finished stay between them and the grippers being released, the rock-shaft V is immediately rocked to push the said push-rods back beneath the clamps and against the pins $h^9$, Figs. 16 and 17, thus turning the spindles $h^6$ and causing the hinged face-plates $h^5$ to simultaneously move inward to release the loops and permit withdrawal of the stay.

The stay may be withdrawn by hooks $w$ on rods W, supported upon the upper part of the machine-frame and pivotally connected to arms $w'$ on the rock-shaft V, which on rocking to push the devices $v'$ back against the pins $h^9$ simultaneously pushes the hooked rods W back under the stay, as represented in Figs. 11 and 12, so that when the shaft is oppositely turned the stay is engaged by the hooks and withdrawn from the clamps. The said hooked rods may be disposed to engage the wire at the sides of the outermost clamps when the latter come together or at intermediate points by passing into the transverse slots or recesses $h^2$, formed below the wire in the upper surfaces of the clamps. The rods W may be provided with side pins or projections $w^2$, which when the rods are pushed back to engage the stay trip or snap under inclined pawls or dogs $w^3$, mounted in suitable supports, as $w^4$, at the sides of the rods and spring-maintained down against the machine-frame; but when the rods are moved forward said pins encounter and ride up the inclined pawls, as indicated by the dotted lines in Fig. 11, thus throwing the hooks suddenly forward and withdrawing the stay before the movable face-plates $h^5$ snap back again against the loops and also forcibly ejecting the stay, which may fall upon suitable inclined rods or guides X and drop from the machine.

The rock-shaft V may be actuated by a lever Y, Figs. 1 and 4, which may be connected to an arm $v^4$ on the shaft by a rod or link $y$, and said lever may be operated by a cam Y' on one of the main shafts, herein shown on the shaft D', said cam being disposed to lift or move the lever immediately after each stay-forming operation to cause the face-plates $h^5$ to recede or move inward and release the loops and immediately oppositely rocked to cause the hooks to withdraw and eject the stay, as will be clearly understood by reference to Fig. 1.

The operation of the machine will be apparent from the foregoing description taken in connection with the accompanying drawings. In Figs. 1, 2, and 4 the machine is represented with its operative parts in the relative positions assumed immediately after outward throw of the rocker-cams F to separate the clamps H, during which movement the feed device has been intermittently rotated to deliver a wire 2, the same falling upon the clamps in about the position shown in Fig. 4. The operating-rollers $e$, carried by the cranks E on the main shafts, having thrown the rocker-cams, have now started up the outer arc-shaped surfaces $f$ thereof to maintain said members stationary in their extreme outward inclined positions, thus holding the clamps separated, and during such inactive travel of the rollers the following movements successively occur, viz: The cam U', Figs. 1 and 20, instantly lifts or moves the lever U, thereby turning the rock-shaft T to cause the butter S' to strike and push the wire endwise against the plate S and the push-rods $t'$ simultaneously to force said wire lengthwise under the grippers L and against the abutments $h'$ on the clamps, whereupon, the wire being thus secured in proper position against the abutments, the cam N' immediately lifts or moves the lever N, thereby turning the shaft M to raise the beam $m$, upon which rest the rearward extensions of the grippers L, and thus forcing said grippers to bear down upon or grip the wire, and thereupon the lever U again is dropped or oppositely rocked to retract the butter S' and withdraw the push-rods $t'$ from engagement with the wire, and during the successive movements just described the cam O' may begin to gradually lift the lever O, continuing such action during the remaining inactive travel of the rollers $e$, (as well during the succeeding opposite or inward throw of the rocker-cams F to close the clamps,) thereby gradually turning the rock-shaft J in a direction to depress the needles K, which are drawn down to engage the wire at substantially the same instant the rollers $e$ pass to positions to oppositely throw the rocker-cams F to close the clamps, as indicated in dotted lines in Fig. 10. The rocker-cams are now moved by the rollers to their said opposite inclined positions, (represented in full lines in Fig. 10,) thereby moving inwardly and closing the clamps and likewise moving inwardly with the clamps the slidable rocker-arms K', which support the needles K, so that the needles are caused to engage the wire always midway adjacent clamps, and during such throw, while the said clamps are being brought together, the cam N' still maintaining the lever N in position to keep the grippers firmly down upon the wire, the cam O' continues, preferably acceleratively, movement of the lever O to further depress the needles, thus bending or folding the wire in between the approaching clamps in the manner already explained, Figs. 7 and 13, said cam suddenly dropping or oppositely moving the lever to elevate instantly the needles to clear the plates $h^3$ and $h^4$ of the clamps just before the latter close or come finally together to clamp and press the loops between them. Having thrown the rocker-cams to position to close the clamps against the loops, the rollers $e$ on leaving the upper recesses $f'$ of said members now pass over the short projections $f^2$, thereby moving the rocker-cams slightly farther inward, and consequently causing the clamps to squeeze or compress the loops more tightly between them, after leaving which projections and thereupon permitting a backlash of the rocker-cams and consequent slight reaction between the clamps the roller traverses the remaining inward arc-shaped surfaces $f$ to maintain the clamps closed, during which inactive travel the following movements occur, viz: The cam N' drops or moves the lever N, thereby oppositely turning the rock-shaft M to lower the beam $m$, and thus release the grippers from the wire, and the cam V' thereupon raises and lowers or vibrates the lever Y, thereby rocking the rock-shaft V to move the push-rods $v'$ beneath the clamps to move the spindles $h^6$, so as to permit the face-plates $h^5$ to move inward and release the loops and the hooks $w$ to withdraw and eject the finished stay.

It is obvious that the several clamps at each side of the intermediate stationary block H' constitute in themselves a complete series adapted for the production of shorter stays, and it will be apparent, therefore, that by providing clamps of equal widths at corresponding positions in the said two series and by increasing or diminishing the number of the clamps employed two stays of any desired length and of exactly like formation may be simultaneously produced or a single wire formed into a long double stay and afterward severed into separate stays. It is also obvious, of course, that the entire number of clamps may, if desired, be connected to a single one of the rocker members F, and thus arranged to alternately open and separate from and toward the end instead of the center of the series, one of the main driving-shafts being then dispensed with and the several mechanism-actuating levers being all operated by cams or other devices from a single driving-shaft, though the arrangement herein represented is preferred, since the action of the clamps at each side of the stationary block is counterbalanced by the action of the clamps at the opposite side, and, furthermore, each clamp of any given number and in the same interval of time is required to move a less distance, and consequently with less speed, thus securing more time for the operation of the needles with the same rate of rotation of the driving-shaft.

The invention is also capable of embodiment in other forms and susceptible of various modifications in details of construction and arrangement of parts, and hence we do not desire to be limited to the particular construction and arrangement herein illustrated.

Having thus fully described our invention, what we claim as new, and desire to secure by Letters Patent of the United States, is—

1. In a machine of the character described, means for forming loops at intervals in a wire and means for pressing the members of individual loops into the same transverse planes; substantially as described.

2. In a machine of the character described, means for supporting a wire, a series of bending devices, and means for operating said devices to bend simultaneously a series of loops in the wire, substantially as described.

3. In a machine of the character described, means for supporting a wire and holding the same zigzag, and means for folding the alternate or correspondingly-deflected portions thereof into loops and pressing the members of said loops together; substantially as described.

4. In a machine of the character described, means for bending a wire stay so as to form loops at intervals therein and intermediate straight portions diverging out of the general line of the wire from and to adjacent loops together with means for compressing the members of individual loops into the same transverse planes; substantially as described.

5. In a machine of the character described, means for bending intermediate portions of a section of wire so as to form loops at intervals therein and intermediate straight portions diverging from and to corresponding members of adjacent loops, together with means for compressing the two members of each loop into the same transverse plane; substantially as described.

6. In a machine of the character described, means for supporting a wire at different points along its length, and means for bringing said points of support together and folding the intervening portions of said wire into loops; substantially as described.

7. In a machine of the character described, means for supporting a wire at different points, and means for simultaneously bringing said points of support together and folding the intervening portions thereof into loops; substantially as described.

8. In a wire-stay-making machine, a pair of movable supports arranged to be alternately separated and brought together, means for securing a wire lengthwise thereagainst when separated, and means for bending the intervening portion thereof in between said supports while coming together; substantially as described.

9. In a wire-stay-making machine, a series of movable wire-supports arranged to be alternately separated and brought together, and means for bending in between said supports while closing portions of a wire placed lengthwise against the series when open; substantially as described.

10. In a wire-stay-making machine, a series of alternately separating and closing clamps adapted on closing to clamp between them loops bent in from a wire placed lengthwise against the separated series; substantially as described.

11. In a wire-stay-making machine, a series of alternately separating and closing clamps, means for securing a wire lengthwise against the open series, and means for bending the portions of said wire which extend across the intervening spaces in between adjacent clamps while the latter are closing; substantially as described.

12. In a wire-stay-making machine, a series of alternately separating and closing clamps, means for bending in between adjacent clamps while closing portions of a wire placed lengthwise against the open series, whereby loops are formed and pressed between said clamps, and means for releasing said loops from the closed clamps; substantially as described.

13. In a wire-stay-making machine, a series of alternately separating and closing clamps, means for bending in between adjacent clamps while closing loops from a wire placed lengthwise against the open series, means for releasing said loops from the closed clamps, and means for simultaneously withdrawing the finished stay; substantially as described.

14. In a wire-stay-making machine, a series of alternately and simultaneously separating and closing clamps, and means for folding simultaneously between each adjacent couple thereof while closing the intervening portion of a wire placed lengthwise against the open series; substantially as described.

15. In a wire-stay-making machine, a series of alternately separating and closing clamps, means for holding a wire lengthwise rigidly against the clamps when separated, in such manner that the portions of said wire which extend across the clamps diverge obliquely from the general line of the wire and the portions which extend across the intervening spaces diverge in opposite directions, and means for bending or folding the said portions extending across said spaces in between adjacent clamps while the latter are closing; substantially as and for the purpose described.

16. In a wire-stay-making machine, a series of alternately separating and closing clamps, the same being provided with correspondingly obliquely disposed abutments thereon, means for securing a wire lengthwise against the clamps when separated and firmly against said oblique abutments, and means for bending or folding the portions of said wire which extend across the intervening spaces in between said clamps while the latter are closing; substantially as and for the purpose described.

17. In a wire-stay-making machine, a pair of separating and closing clamps, means for securing a wire lengthwise rigidly against said clamps when separated in such manner that said wire is held on one clamp slightly in advance of where it is held on the other, and means for bending the intermediate portion of said wire which extends across the intervening space in between said clamps as they move together, whereby a loop is produced in the wire having its members lying in the same transverse plane to the body thereof; substantially as described.

18. In a wire-stay-making machine, a series of alternately separating and closing clamps, means for delivering a wire lengthwise upon the series simultaneously as the clamps separate, and means for bending in between adjacent clamps the portions of said wire which extend across the intervening spaces while said clamps are closing; substantially as described.

19. In a wire-stay-making machine, a series of intermittently separating and closing clamps, means for securing a wire lengthwise rigidly against said clamps when they stand separated, means for bending the portions of said wire which extend across the intervening spaces in between adjacent clamps while closing, and means for releasing the loops while the clamps are closed; substantially as described.

20. In a wire-stay-making machine, a series of movable clamps arranged to separate and come together alternately from and toward an intermediate point of the series, and means for bending intermediate portions of a wire placed lengthwise against the open series in between adjacent clamps while the latter are closing; substantially as described.

21. In a wire-stay-making machine, a series of clamps or blocks arranged to separate and come together alternately from and toward an intermediate fixed member of the series, and means for bending in between adjacent clamps while closing intermediate portions of a wire placed lengthwise against the open series; substantially as described.

22. In a wire-stay-making machine, a series of simultaneously-movable clamps arranged to separate and come together alternately from and toward an intermediate point of the series, and means for bending simultaneously in between each adjacent couple while closing the intervening portion of a wire placed lengthwise against the open series; substantially as described.

23. In a wire-stay-making machine, a series of alternately separating and closing clamps, the same being provided with abutments thereon, and a series of push-rods adapted when a wire is placed upon the open clamps to force said wire against said abutments, means for temporarily securing the wire in such position, and means for bending portions of said wire in between the clamps as they close together; substantially as described.

24. In a wire-stay-making machine, a series of alternately separating and closing clamps, the same being provided with oblique abutments thereon, a series of push-rods adapted when a wire is placed upon the open clamps to force the same against said abutments, said push-rods being disposed to engage the wire at the sides of the clamps adjacent the rearmost ends of said abutments, so as to properly deflect the wire across the clamps and intervening spaces, means for temporarily securing the wire in such position, and means for bending the portions thereof which extend across said spaces in between the clamps as the latter move together; substantially as described.

25. In a wire-stay-making machine, the combination, with a series of alternately separating and closing clamps adapted on closing to press loops bent in between them from wires placed lengthwise against the series when separated, of means for securing each successive wire in the same position endwise and lengthwise upon the clamps; substantially as described.

26. In a wire-stay-making machine, the combination, with a series of alternately separating and closing clamps adapted on closing to clamp loops bent in between them from a wire placed lengthwise against the clamps when separated, of an abutment at one end of said series, and a butter at the opposite end adapted when a wire is placed upon the clamps to push the same endwise against said abutment; substantially as described.

27. In a wire-stay-making machine, the combination, with a series of alternately separating and closing clamps adapted on closing to clamp loops bent in between them from a wire placed lengthwise against the separated series, of an abutment at one end of said series, and a butter at the opposite end spring-forced toward said abutment, a rock-shaft to which said butter is connected, the same normally holding said butter against force of its spring, a series of push-rods secured to arms on said rock-shaft, and means for rocking said shaft to permit the butter to force a wire endwise against the opposite abutment and to cause the push-rods to simultaneously force the wire lengthwise into proper position upon the clamps; substantially as described.

28. In a wire-stay-making machine, a series of alternately separating and closing clamps, the same being provided with wire-gripping devices, means whereby said devices are caused to grip a wire placed upon the clamps when separated and to hold the same while the clamps are closing, means for bending portions of said wire in between the clamps while closing, and means for thereupon releasing the gripping devices; substantially as described.

29. In a wire-stay-making machine, a series of movable supports arranged to be separated and brought together alternately, between which on closing loops are bent in from a wire placed lengthwise against the separated series, wire-gripping devices pivotally mounted on said supports and having opposite extensions, a longitudinal bar upon which said extensions are slidably supported, and means for raising and lowering said bar to cause the grippers to grip and release the wire respectively before and after the loop-bending operation; substantially as described.

30. In a wire-stay-making machine, a series of movable supports arranged to be separated and brought together alternately, between which on closing loops are bent in from a wire placed lengthwise against the separated series, wire-gripping devices pivotally mounted on said supports and having opposite extensions, a longitudinal bar upon which said extensions are slidably supported, said bar being secured lengthwise to a rock-shaft, and means for rocking said shaft to cause the grippers to alternately grip and release the wire; substantially as described.

31. In a wire-stay-making machine, the combination, with a series of alternately separating and closing supports between which while closing loops are bent from a wire laid lengthwise upon the separated series, wire-gripping devices being pivotally mounted on said supports, and means for causing said devices to grip or release a wire placed under them, of a series of push-rods adapted when a wire is placed upon the separated series to push the same under said gripping devices; substantially as described.

32. In a wire-stay-making machine, a series of movable supports arranged to be alternately separated and brought together, a series of intermediately-disposed wire-bending devices arranged to move therewith, and means whereby said devices are operated to bend portions of a wire placed against the separated supports in between the latter as the series closes; substantially as described.

33. In a wire-stay-making machine, a series of alternately separating and closing clamps, a series of intermediately-disposed needles traveling longitudinally therewith, means for moving said needles to engage a wire placed against the clamps when separated and to bend portions thereof in between adjacent clamps while closing, and means for suddenly oppositely moving said needles to escape the clamps before they finally come together; substantially as described.

34. In a wire-stay-making machine, a series of alternately separating and closing clamps, the same being provided with confronting clamping-plates, a series of needles traveling with and disposed between adjacent clamps behind said plates, means for causing said needles to engage a wire placed against the clamps when separated and bend loops therein between said clamping-plates while the clamps are closing, and means for moving said needles to escape said clamping-plates before they finally come together to press the loops; substantially as described.

35. In a wire-stay-making machine of the character described, the combination, with the series of wire-supports arranged to be alternately separated and brought together, of the intermediately-disposed needles arranged to travel therewith, said needles being mounted on rocker-arms slidable on a polygonal rock-shaft, and means for rocking said shaft to reciprocate the needles transversely of their travel; substantially as and for the purpose described.

36. In a wire-stay-making machine of the character described, the combination, with the series of alternately separating and closing clamps, of the intermediately-disposed needles arranged to move therewith, said needles being pivotally mounted on a series of rocker-arms slidably secured on a rock-shaft, means for rocking said shaft to alternately depress and elevate the needles, and means for guiding said needles to cause them to engage portions of a wire placed upon the clamps when separated and bend loops therein in exact alinement while the clamps are closing; substantially as described.

37. In a wire-stay-making machine, the combination, with the series of alternately separating and closing clamps, of the intermediately-disposed needles arranged to travel therewith, means for moving said needles transversely to bend in between adjacent clamps while closing loops from a wire placed lengthwise against the separated series, and means for guiding said needles consisting of crank-like devices connected thereto and pivoted to said clamps to allow a rocking movement; substantially as described.

38. In a wire-stay-making machine, the combination, with the series of alternately separating and closing clamps, of the intermediately-disposed needles arranged to travel therewith, means for moving said needles transversely to bend in between adjacent clamps while closing loops from a wire placed lengthwise against the separated series, and means for guiding said needles consisting of double-crank-shaped devices having their intermediate folds entered through the needles and their ends slidably pivoted at adjacent clamps; substantially as described.

39. In a wire-stay-making machine, a series of alternately separating and closing clamps, and a series of intermediately-disposed needles traveling therewith, means whereby said needles are caused to bend loops from a wire laid upon the separated series in between adjacent clamps while the latter are closing, and means for imparting crank motion to said needles; substantially as described.

40. In a machine of the character described, the alternately separating and closing clamps, and the intermediate needles consisting of thin upright bars having overhanging notched portions, and means for alternately depressing and elevating said needles; substantially as and for the purpose described.

41. In a wire-stay-making machine, a series of separating and closing clamps, one clamp of each adjacent couple having a movable plate in its clamping face or side, means for bending in between the clamps as they come together loops from a wire laid against the series when separated, and means for moving said plates when the clamps are closed to release said loops; substantially as described.

42. In a wire-stay-making machine, a series of separating and closing clamps adapted on closing to clamp loops bent in between them from a wire placed against the separated series, one clamp of each adjacent couple being provided with a movable plate in its clamping side or face and recessed behind said plate, means for normally holding said plate outward, and means for permitting said plate to move inward to release the loops after the clamps close against the same; substantially as described.

43. In a wire-stay-making machine, a series of separating and closing clamps adapted on closing to clamp loops bent in between them from a wire laid lengthwise against the separated series, one clamp of each adjacent couple being provided with a movable plate in its clamping side or face, spindles journaled behind said plates, means for normally holding said spindles in position to maintain the plates outward, and means for turning said spindles to permit said plates to move inward and release the loops after the clamps are inclosed thereagainst; substantially as described.

44. In a wire-stay-making machine, a series of separating and closing clamps adapted on closing to clamp loops bent in between them from a wire laid lengthwise against the open series, one clamp of each adjacent couple being provided with a movable plate in its clamping side or face, spindles journaled behind said plates against which the latter are spring-forced, said spindles being spring-maintained in position to hold the plates outward and being provided with protruding eccentric projections, and a series of devices adapted simultaneously to engage said projections and turn the spindles to permit the movable plates to move inward and release the loops; substantially as described.

45. In a wire-stay-making maching, the combination, with the series of separating and closing clamps, one of each adjacent couple of which is provided with a movable plate in its clamping-face, and devices normally holding said plates outward but adapted to be moved to permit the same to move inward, of means for moving simultaneously all of said devices when the clamps are closed to move the plates inward and release the loops to permit withdrawal of the finished stay from the clamps; substantially as described.

46. In a wire-stay-making machine, the combination, with the series of separating and closing clamps adapted on closing to clamp loops bent in between them from a wire laid lengthwise against the separated series, one clamp of each adjacent couple being provided with a movable plate in its clamping-face, and devices spring-forced to hold said plates outward but adapted to be turned to permit them to move inward, of a rock-shaft, a series of push-rods secured to arms on said rock-shaft, and a number of hooks connected to arms on said shaft, whereby when said shaft is rocked the said push-rods engage and move said spring devices to permit the plates to move inward to release the loops, and said hooks simultaneously engage and withdraw the finished stay; substantially as described.

47. In a wire-stay-making machine, the combination with means for holding a section of wire and forming loops therein, and means for releasing the finished stays, of a stay-ejecting device, comprising a pivotally-supported reciprocatory member having a lug thereon, and a vibratory member having an inclined plane arranged in the path of movement of said lug, whereby the lug will move past said vibratory member when traveling in one direction, and will ride up the inclined plane thereon when traveling in the opposite direction, and thereby lift the free end of the pivoted member as the latter begins to withdraw the stay, so as to effect a quick withdrawal; substantially as described.

48. In a wire-stay-making machine, the combination, with the separating and closing clamps between which on closing loops are bent in from a wire laid lengthwise upon the separated series, of a number of rods provided with hooks adapted to move under and engage and withdraw the finished stay, said rods being pivotally secured to vibratory supports, inclined pawls mounted at the sides of said rods, pins on said rods which when the latter move under the wire snap under said pawls and on opposite movement ride up the same, whereby the hooks are suddenly thrown forward; substantially as described.

49. In a wire-stay-making machine, the combination with the separating and closing clamps adapted on closing to clamp between them loops bent from a wire laid lengthwise upon the separated series, one clamp of each adjacent couple having a movable plate in its clamping-face, and devices normally holding said plates outward but adapted to be turned to move them inward to release the loops, of a series of push-rods adapted to engage and turn said devices, and a series of hooked rods pivotally secured to vibratory supports and adapted simultaneously to pass under the wire, inclined pawls at the sides of said last-mentioned rods, pins on said rods which when the latter are moved under the stay snap under said pawls and on opposite movement ride up the same, whereby the hooks are thrown suddenly forward to withdraw the stay before the movable plates move back against the loops; substantially as described.

50. In a wire-stay-making machine, the combination, with the series of alternately separating and closing clamps, of an intermittent feed device adapted to deliver a wire upon the clamps as the latter separate; substantially as described.

51. In a wire-stay-making machine, the combination with a series of clamps, of an intermittent feed device consisting of a shaft having a series of disks thereon with equidistant notches in their peripheries, and guides for presenting the wires in proper position to be received by the notches in said disks; substantially as described.

52. In a wire-stay-making machine, the combination, with a series of clamps, of a feed device comprising an intermittently rotative shaft longitudinally disposed above said series and having disks thereon provided with equidistant circumferential notches, inclined guide-bars between which wires to be formed into stays are led to the feed device, said bars having curved guards formed at their extremities surrounding said disks and separated below the shaft, and means whereby, at each intermittent rotation of the shaft, one of the notches of each disk is brought into alinement with the spaces between the guide-bars, to receive a wire therefrom, while a wire is dropped from other notches upon the clamps through the separations in the guards; substantially as described.

53. In a machine of the character described, the combination, with a series of slidable and alternately separating and closing blocks between which while closing loops are bent from a wire placed lengthwise against the separated series, of an actuating rocker member connected to each of said blocks and adapted on rocking to separate and bring the same together; substantially as described.

54. In a machine of the character described, the combination with the slidable blocks and interarranged needles, of an actuating rocker member, and connections therefrom to each of said blocks and needles, whereby said blocks are alternately separated and brought together and the needles caused to travel with the same; substantially as and for the purpose described.

55. In a machine of the character described, the combination, with a series of slidable blocks, and a series of intermediately-disposed needles, the latter being pivotally mounted on rocker-arms slidable on a polygonal rock-shaft, of an actuating rocker member connected to each of said blocks and rocker-arms, whereby the former are alternately separated and brought together and the latter moved therewith, and means for rocking said polygonal rock-shaft while the blocks are moving together; substantially as and for the purpose described.

56. In a machine of the character described, the combination, with a pair of oppositely synchronously rocking members, of a series of slidable blocks alternately separating and closing from and toward an intermediate point, the oppositely-moving blocks of the series being connected to the correspondingly-moving rocking members respectively; substantially as described.

57. In a machine of the character described, the combination, with a pair of oppositely synchronously rocking members, of a series of slidable blocks and a series of intermediately-disposed needles, said blocks and needles at opposite sides of an intermediate point in the series being respectively connected to the corresponding rocking members, the connections being arranged so that the blocks are alternately separated and brought together from and toward said intermediate point and the needles moved longitudinally therewith, and means for moving the needles transversely; substantially as and for the purpose described.

58. In a machine of the character described, the combination with a series of slidable blocks or clamps, alternately and intermittently separating and closing, and a driving-shaft having a crank provided with a roller, of the actuating rocker-cam having suitable connection with the clamps and operated by said roller; said rocker-cam having confronting arc-shaped surfaces traversed in turn by the roller to maintain the member stationary at its opposite extreme positions, and said surfaces terminating in recesses which receive the roller when throwing the member; substantially as described.

59. In a machine of the character described, the combination, with the alternately and intermittently separating and closing clamps adapted on closing to clamp between them loops bent in from a wire placed lengthwise against the separated series, and a driving-shaft, of the actuating rocker-cam connected to said clamps, and an operating-roller therefor carried by a crank on said shaft; said rocker-cam having confronting arc-shaped surfaces traversed in turn by the roller to maintain the member stationary to hold the clamps upon and closed respectively, and recesses at the terminals of said surfaces which receive the roller when throwing the member, the arc-shaped surface which the roller traverses after throwing the member in a direction to close the clamps having a short projection traversed by the roller to shove the clamps more closely together; substantially as described.

60. In a wire-stay-making machine, a series of alternately separating and closing clamps adapted on closing to clamp between them loops bent in from a wire laid lengthwise against the open series, means for forcing said clamps still closer together to squeeze said loops after the clamps are closed thereagainst, means for thereupon permitting a slight reaction between the clamps, and means for releasing the loops to permit the finished stay to be withdrawn; substantially as described.

61. In a wire-stay-making machine, the combination, with the series of alternately separating and closing clamps, the same being provided with the wire-gripping devices and loop-releasing devices, and the intermediately-disposed needles, of means whereby said grippers are caused to grip a wire placed upon the clamps when separated, means for depressing the needles while the clamps move together, means for thereupon releasing the grippers, and means for operating the loop-releasing devices to release the loops to permit withdrawal of the finished stay; substantially as described.

62. In a machine of the character described, a series of clamps, means for separating and closing said clamps, and means for bending loops from a wire placed upon the series between adjacent clamps while closing; substantially as described.

63. In a machine of the character described, a series of wire-supporting clamps, means for separating and closing said clamps, a series of coöperating devices adapted to bend loops from the wire in between adjacent clamps while closing, and means for releasing the loops without separating the clamps; substantially as described.

In testimony whereof we affix our signatures in presence of two witnesses.

JAMES KELLEY.
PETTIS A. REID.

Witnesses:
EDWIN G. KEMPER,
WALTER V. REID.